United States Patent [19]
Wallen

[11] Patent Number: 4,543,067
[45] Date of Patent: Sep. 24, 1985

[54] AMUSEMENT DEVICE

[76] Inventor: Milton A. Wallen, 2055 N. New Hampshire, Los Angeles, Calif. 90027

[21] Appl. No.: 637,830

[22] Filed: Aug. 6, 1984

[51] Int. Cl.⁴ .............................................. G09B 23/06
[52] U.S. Cl. .................................... 434/300; 273/161; 446/396
[58] Field of Search ................ 273/141 R, 161, 1 GF; 434/278, 300, 301, 302; 446/325, 326, 396; 40/617

[56] References Cited
U.S. PATENT DOCUMENTS 1,646,830 10/1927 Mueller ................................ 446/326
3,623,239 11/1971 Maslokovets ........................ 434/300
3,750,308 8/1973 Nelson ............................. 446/396 X
3,877,697 4/1975 Lersch ............................. 446/396 X

FOREIGN PATENT DOCUMENTS 964851 2/1950 France .............................. 273/141 A
248353 7/1969 U.S.S.R. ............................. 434/300

Primary Examiner—Harland S. Skogquist
Attorney, Agent, or Firm—Harlan P. Heubner

[57] ABSTRACT

A light weight elongated tubular structure is counterbalanced by a depending weight around a pivot formed by a sharp point in contact with a hard flat horizontal surface, rotating around its pivot point in response to a user's approach to the remote end of the structure.

1 Claim, 7 Drawing Figures

U.S. Patent    Sep. 24, 1985    4,543,067
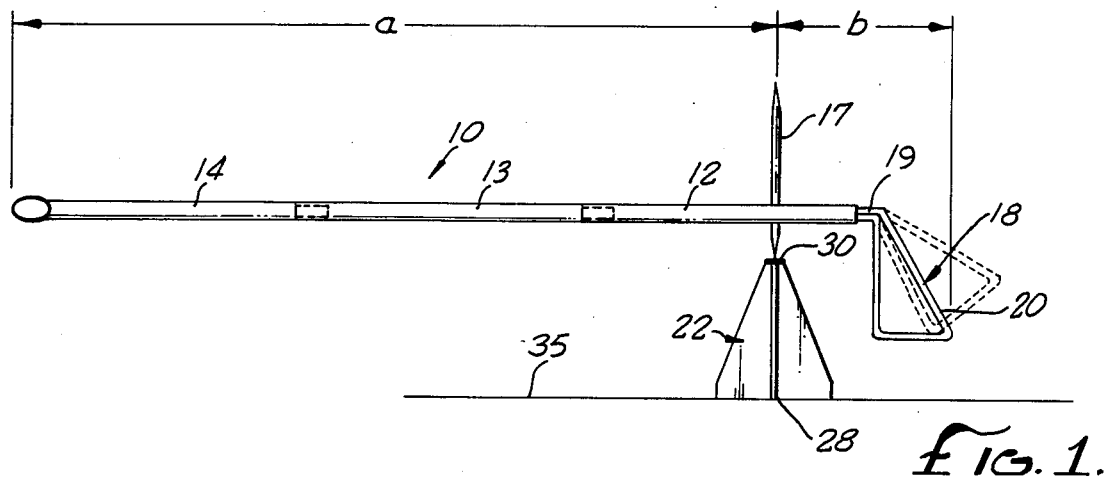
FIG. 1.
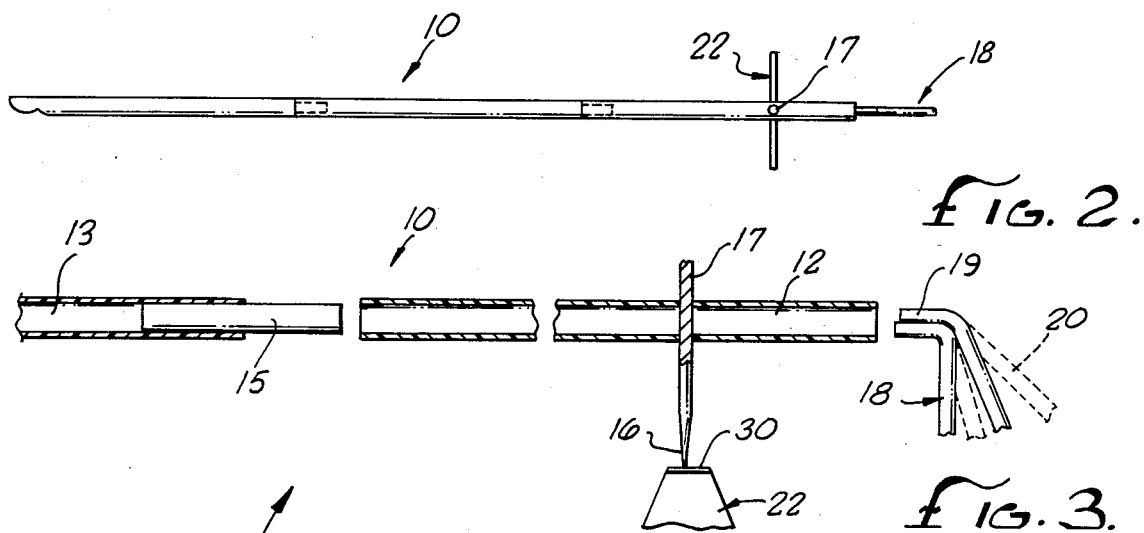
FIG. 2.
FIG. 3.
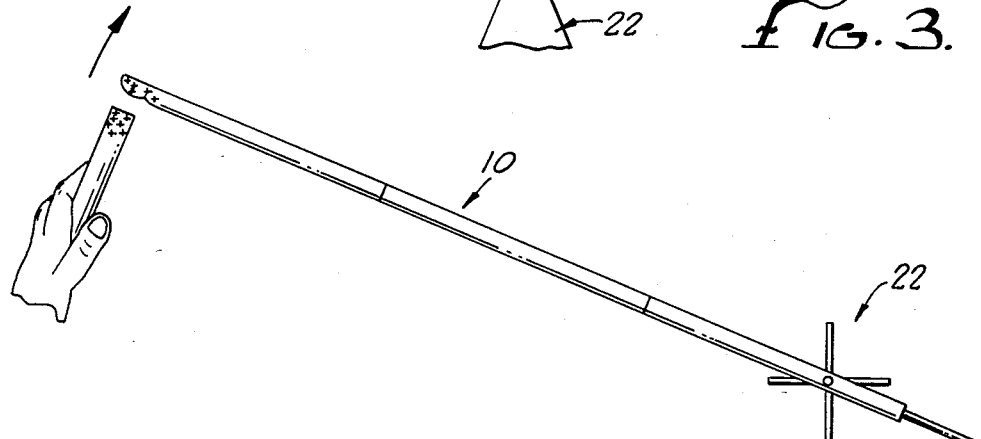
FIG. 4.
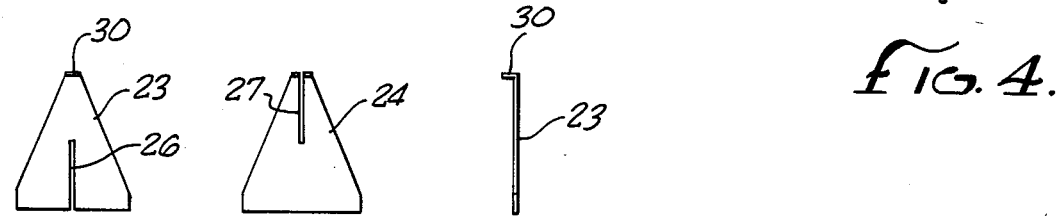
FIG. 5.    FIG. 6.    FIG. 7.

AMUSEMENT DEVICE

BACKGROUND OF THE INVENTION

The present invention relates to amusement devices and more particularly to devices for producing movement of a balanced structure in response to an approach by the user's hand or the like.

SUMMARY OF THE INVENTION

According to the present invention, a very light weight tubular structure is mounted upon an elevated horizontal surface by balancing the structure on a sharply pointed pivot member located closely adjacent one end of the tubular structure. The longer portion of the tubular structure on one side of the pivot member is counter-balanced by a depending counter-weight on the opposite side of the pivot member. The entire tubular structure is balanced by fabricating the tubular structure in sections adjustably connected to each other so that the length of the structure at one side of the pivot may be varied and the counter-weight likewise is adjustably mounted in the opposite end of the tubular structure so that the distance between the counter-weight and the pivot may be varied and so that the counter-weight may be rotationally adjusted within the end of the tubular structure in which it is mounted for the purpose of vertically orienting the pivot member.

Because the sharply pointed pivotal mounting of the structure is so nearly friction free and the tubular structure itself is so light in weight, very slight movements of the air near the tubular structure will effect its rotation about the pivot. It has been observed that moving one's hand close to the structure adjacent its end most remote from the pivot causes the structure to rotate on its pivot. Whether some electrical force emanating from the person causes such movement, or whether it is caused by air movement is not known.

BRIEF DESCRIPTION OF THE DRAWING

FIG. 1 is a view in side elevation of a device embodying the present invention;

FIG. 2 is a view in plan of the device of FIG. 1;

FIG. 3 is a view in side elevation and partly in section of portions of the device of FIG. 1;

FIG. 4 is a view in plan of the device of FIG. 1 illustrating the manner in which rotational movement of the tubular structure can be produced; and FIGS. 5, 6 and 7 are detail views of elements of the base of the device of FIG. 1.

DESCRIPTION OF THE PREFERRED EMBODIMENT

As shown in the accompanying drawing, the device of the present invention comprises a sectional tubular structure 10 composed, in the illustrated embodiment of three sections 12, 13 and 14, respectively, of thin walled plastic material connected together by connector means 15 of similar light weight tubular material sized to frictionally engage within the open ends of the sections 12, 13 and 14, so that the connector means 15 serves as means for adjustably varying the length of the sectional tubular structure 10.

A pointed pivot member 17 extends normal to the longitudinal axis of the tubular structure 10 at a location adjacent the open end of the pivot section 12, being secured in position by frictional engagement with the walls of the pivot section 12 which it pierces at diametrically opposite points.

Carried in the open end of the pivot section 12 of the tubular structure 10 is a counter-weight 18 having a horizontal portion 19 sized for frictional engagement within the open end of the pivot section 12 of the tubular structure 10 and adjustable with respect thereto by movement inwardly or outwardly of the section 12. The counter-weight 18 also includes a depending portion 20 which may be bent with respect to the horizontal portion 19 to vary the moment exerted by the counter-weight in relation to the pivot member 17.

The entire assembly comprising the sectional tubular structure 10, pointed pivot member 17, and counter-weight 18 is designed to be balanced upon a face 22 which may conveniently be fabricated from two generally triangular sections 23 and 24 (see FIGS. 5 and 6) which are provided with oppositely extending slots 26 and 27 whereby the sections may be nested to form a base 22 of the configuration illustrated in FIG. 1.

The base section 23 is provided with a horizontal upper end 30 presenting a horizontal surface at an elevation sufficiently above the lower end 28 of the base 22 to insure that the counter-weight 18 will clear the surface 35 upon which the entire assembly rests.

In use, the lower pointed end 16 of the pivot member 17 is rested upon the horizontal surface 30 presented at the upper end of the base 22, and the entire assembly consisting of the sectional tubular structure 10, the pivot member 17, and the counter weight 18 is balanced around the pointed lower end 16 of the pivot member 17 by adjusting the connector means 15 with respect to the sections 12, 13 and 14 of the sectional tubular structure 10, and by adjusting the position of the counter weight 18 with respect to the section 12 by varying the degree of insertion of the horizontal portion 19 into said section. At the same time, the horizontal portion 19 of the counter-weight 18 may be adjusted rotationally with respect to the section 12 to bring the pivot member 17 to a vertical orientation. When the assembly has been balanced upon the base 22 in this manner, it has been observed that the mere bringing of a hand held object, or even one's hand alone, adjacent the open end of the end section 14 of the sectional tubular structure 10 will be accompanied by a rotation of the sectional tubular structure 10 upon the axis of the pivot member 17 around the surface 30. The cause of this movement is not completely understood, but is believed to be due to energy transmitted in some manner from the person of the user of the device to the balanced assembly either electrically or by air movement induced by the user's approach.

I claim:

1. An amusement device comprising a base presenting an elevated horizontal surface, a sectional tubular structure having connector means between the sections thereof for adjustably varying the length of said structure, means for supporting said tubular structure upon said base comprising a pointed pivot member carried by said tubular structure and extending normal to the axis thereof at a position adjacent one end thereof, and means for counter-balancing said tubular structure with respect to said pivot member comprising a counter-weight depending a distance less than the elevation of said horizontal surface from the end of said tubular structure adjacent said pivot member, and means for adjustably varying the distance between said counter-weight and said pivot member.

* * * * *